Nov. 5, 1963   R. S. HEDIN   3,109,545
TELESCOPIC MATERIAL HANDLING SUPPORT
Filed Dec. 15, 1959
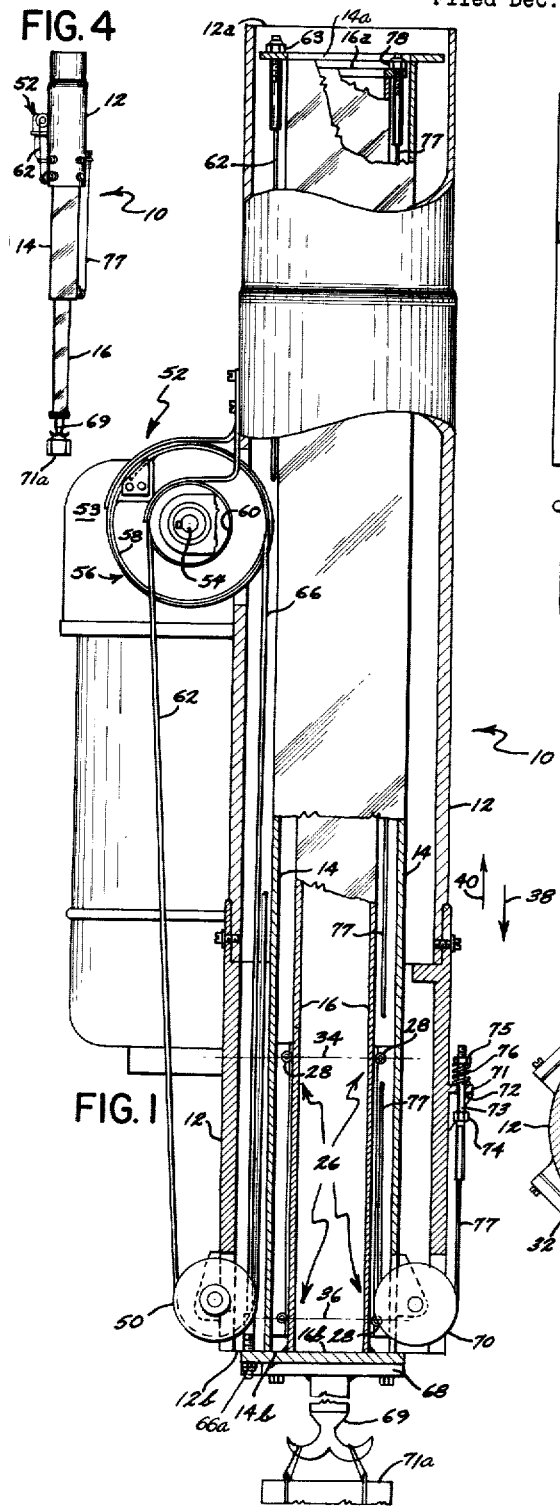
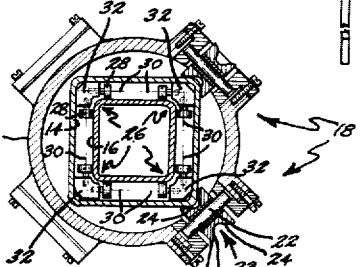
INVENTOR.
ROBERT S. HEDIN
BY
Kenneth D. Ohm
ATTORNEY

United States Patent Office 3,109,545
Patented Nov. 5, 1963

3,109,545
TELESCOPIC MATERIAL HANDLING SUPPORT
Robert S. Hedin, Minneapolis, Minn., assignor to
General Mills, Inc., a corporation of Delaware
Filed Dec. 15, 1959, Ser. No. 859,708
4 Claims. (Cl. 214—658)

The present invention relates to telescopic material handling supports. More particularly, it pertains to telescopic material handling supports composed of three elongated members adapted for telescopic movement between extended and retracted positions with respect to each other along their longitudinal axis. These members are interconnected by cable means which is arranged to apply positive driving force to said members to move them toward either their extended or retracted positions.

Some telescoping apparatus consisting of a plurality of tubular members adapted for telescopic movement with respect to each other and interconnected by cable means have been suggested in the prior art. A disadvantage of such telescoping apparatus is that they do not provide positive drive means for both extending and retracting said apparatus. Also when such telescoping members are constructed of very light weight material and relative movement of said members along their longitudinal axis in a vertical plane is desired, gravity fails to provide sufficient force to cause either extension or retraction of said apparatus.

Accordingly, one object of this invention is to provide such a telescopic support which need not depend upon gravity for either extension or retraction thereof.

A further object of this invention is to provide such a telescopic support consisting of a plurality of elongated members with positive drive means for both extending and retracting said telescoping apparatus, i.e., for moving said elongated members relative to each other along their longitudinal axis.

Another object is to provide a telescopic material handling apparatus comprising a plurality of elongated tubular members adapted for telescopic extending and retracting movement with respect to each other and interconnected by cable means in which the movement of each tubular member with respect to the other tubular members is provided and positively controlled by said cable means.

Other objects and advantages of the invention will be apparent from the following description in which certain preferred embodiments of the invention are disclosed.

In the drawings which form a part of this application,

FIGURE 1 is a side elevational view of elongated members employing the present invention. Sections thereof are broken away to show some of the details of the cable means of the present invention.

FIG. 2 is a left side view of the device shown in FIG. 1.

FIG. 3 is a detailed cross section through the elongated members of FIG. 2 taken along lines 3—3 and looking in the direction of the arrows.

FIG. 4 is, in miniature, a side elevational view of the elongated members of FIG. 1 in extended position.

FIGURE 1 illustrates one embodiment of the present invention. The telescopic support 10 includes a first elongated tubular member 12 having a first end 12a and a second end 12b, a second elongated tubular member 14 having a first end 14a and a second end 14b, and a third elongated tubular member 16 having a first end 16a and a second end 16b. The tubular member 12 is circular in cross sectional area while the tubular members 14 and 16 are rectangular in cross sectional area (see FIG. 3). Tubular member 14 is adapted for telescopic movement along its longitudinal axis with respect to tubular member 12 and tubular member 16 is adapted for telescopic movement along its longitudinal axis with respect to tubular member 14.

The third tubular member 16 has a flange 68 fastened to its second end 16b. Connected to the flange 68 is a material handling hook means 69 which carries a load 71a.

Suitable tube guide means 18 are positioned between the tubes 12 and 14. This guide means 18 consists of eight (8) identical rotatable wheels 20 four of which are positioned in plane 19 and the other four being positioned in plane 21. Planes 19 and 21 are normal to the longitudinal axis of first tube 12. The details of one of these wheels are shown in FIG. 3. The wheel 20 is mounted for rotation on a cylindrical member 22 which is fixedly mounted in first elongated member 12 in plane 19 as is well known in the art. The rotating member 20 has a slot or groove 23 therein. The edges of this groove 24 engage one of the four corners of the second tube 14. The other three corners of the tube 14 are each engaged by rotating members similarly constructed and mounted as rotating member 20. These three additional rotating members are located in plane 19. Four more rotating members similarly constructed and mounted are positioned on first tubular member 12 in plane 21.

Other tube guide means 26 is positioned between second elongated tube 14 and third elongated tube 16 to maintain proper clearances between said tubes when they move longitudinally with respect to each other. This guide means 26 is mounted on second elongated tubular member 14 and consists of sixteen (16) identical rollers 28 which rotate about axes 30. Eight of these rollers 28 are located in one plane as shown in FIG. 3. These rollers 28 are attached as is well known in the art to clamps 32. The clamps 32 which permit the rollers 28 to rotate about their axes 30 are secured to the second tubular member 14 along a plane 34 which is perpendicular to the elongated axis of the second tubular member 14. Eight more rotating members similarly constructed and mounted are positioned on second tubular member 14 in a plane 36 which is parallel to and longitudinally spaced from plane 34.

By means of the aforementioned guide means 18 and 26 first tube 12, second tube 14, and third tube 16 can move relative to each other in the directions indicated by arrows 38 and 40. When the tubes 12, 14 and 16 are in the position indicated in FIG. 1 the telescopic support 10 is in its fully retracted position. If first tube 12 is held stationary and tubes 14 and 16 are moved relatively in the direction indicated by arrow 38, the telescopic support 10 moves toward its fully extended position. FIGURE 4 shows, in miniature, the support 10 in its fully extended position. With first tubular member 12 held stationary and tubes 14 and 16 somewhere between the fully retracted position shown in FIG. 1 and the fully extended position shown, in miniature, in FIG. 4, movement of said tubular members 14 and 16 in the direction indicated by the arrow 40 causes the telescoping support 10 to retract, i.e., the tubes 12, 14, and 16 retract with relation to each other along their longitudinal axes, and movement of tubular members 14 and 16 in the direction indicated by the arrow 38 causes the support 10 to extend, i.e., the tubes 12, 14, and 16 extend with relation to each other along their longitudinal axes.

The features according to the invention which cause the telescopic support 10 to extend and/or retract will now be discussed in detail.

Briefly the invention contemplates the provision of first cable means for driving one of the members toward extended position, second cable means for driving another member toward retracted position, and third cable means interconnecting the members in such a manner as to transmit such driving forces to the remaining members which are not directly driven.

As shown in FIGURE 1 a sheave 50 is mounted for rotation in one end of the first elongated tubular member 12. Also mounted on first tubular member 12 is a drive means 52. The drive means 52 includes a motor 53 which rotates an axle 54. The motor 53 is a gear motor with reverse drive. Means for reversing said motor (not shown) are also part of said drive means 52. The axle 54 could also be rotated by means of a winch (not shown). Secured to the axle 54 is a double faced drum 56 having a circular face 58 and a circular face 60. Key ways (not shown) are provided to prevent rotation of the drum 56 about the axle 54. The circumference of the face 58 is twice the circumference of the face 60. Attached to the smaller face 60 is one end of a first cable 62 which loops around and is reeved in the circular groove of the sheave 50. The other end of cable 62 is affixed to the first end 14a of second elongated tube 14 at point 63. A second cable 66 is attached at one end to the larger face 58 of drum 56. This cable 66 has its other end fashioned at point 66a to the flange 68 which is located at the second end 16b of third elongated tube 16.

Mounted in the second end 14b of the second tubular member 14 is a sheave member 70. Projecting from the outer surface of tubular member 12 is a flange 71 having a hole 72. Passing through the hole 72 and freely moveable therein is a threaded shaft 73 having bolts 74 and 75 on either end thereof. Positioned around said shaft 73 and between the bolt 75 and the flange 71 is a spring bias means 76. One end of a third cable 77 is attached to the end of shaft 73 which carries the bolt 74. The third cable 77 loops around sheave 70 and is reeved in said sheave 70. The other end of the third cable 77 is attached to the first end 16a of the third elongated member 16 at point 78. The spring bias means 76 takes up any slack in said first, second and third cables—62, 66 and 77 respectively.

In operation, when motor 53 rotates axle 54 and causes the double faced drum 56 to rotate in a clockwise direction the telescopic support 10 will extend. Clockwise rotation (in FIG. 1) of the double faced drum 56 causes first cable 62 to wind up around drum face 60. This causes the second elongated tubular member 14 to move relatively to tube 12 in the direction indicated by arrow 38. Movement of second tubular member 14 in the direction indicated by arrow 38 causes third cable 77 to move third tubular member 16 in the same relative direction of arrow 38 twice the distance that member 14 has moved. Because of the differences in the circumferences of faces 58 and 60 and the fact that each of said faces rotates with the same angular velocity, the amount of second cable 66 unwound from drum face 58 will be exactly twice the amount of first cable 62 wound up on drum face 60 for any particular angular rotation of the drum 56. This permits the second end 16b of tubular member 16 to move twice the distance in the direction of arrow 38 as second tubular member 14 moves, since second cable 66 is unwound from drum face 58 at twice the rate that cable 62 is wound up on drum face 60.

When the telescopic support 10 is in its extended position as indicated in FIGURE 4 and it is desired to return said support toward its retracted position as indicated in FIGURE 1, the motor 53 is actuated to rotate drum 56 in a counterclockwise direction (in FIG. 1). This counterclockwise rotation of drum 56 causes second cable 66 to wind up on drum face 58 and move third tubular member 16 in the relative direction of arrow 40 with respect to tube 12. For each two inches the second cable 66 winds up on drum face 58, the third tubular member 16 moves two inches in the direction indicated by arrow 40. This two inch movement causes the end of third cable 77 which is attached to the first end 16a of the third tubular member 16 to move two inches in the direction of arrow 40. This two inch movement of the end of the third cable which is attached to the first end 16b of third tubular member 16 causes the second tubular member 14 to move one inch in the relative direction indicated by the arrow 40. This one inch movement of second tubular member 14 in turn causes the end of the first cable 62 which is attached to the first end 14b of said second tubular member 14 to move one inch in the direction of arrow 40. Since the circumference of the drum face 60 is one half of the circumference of the drum face 58, the length of first cable 62 unwound from drum face 60 for a given angular counterclockwise movement of the drum 56 will be one half of the length of second cable 66 wound up on drum face 58. Thus a two inch wind up of second cable 66 on drum face 58 by a particular amount of counterclockwise rotation of the drum 56 causes one inch of the first cable 62 to be unwound from drum face 60. Therefore the necessary length of cable 62 to permit the second tubular member 14 to move one inch in the direction indicated by the arrow 40 is available when the second end 16b of third tubular member 16 moves two inches in the direction indicated by the arrow 40.

The novel orientation of the three cables disclosed herein provides positive cable drive means for telescopic extending and retracting movements in apparatus having three elongated members adapted for relative movement with respect to each other along their longitudinal axes. This cable drive arrangement insures predetermined relative extending and retracting movement of the members in a desired constant ratio for the relative distance moved by the respective members.

In view of the principles set forth herein, I have shown some of the ways of carrying out the present invention and some of the equivalents which are suggested by these disclosures.

What is claimed:

1. A telescopic material handling apparatus comprising a plurality of tubular members adapted for telescopic movement with respect to each other and interconnected by cable means, said tubular members including a first member having first and second ends, a second member having first and second ends, said second member telescopically moveable with respect to said first member, and a third member having first and second ends, said third member telescopically moveable with respect to said second member, a material handling means attached to said third member, drum means fixedly mounted with respect to one of said tubular members, drive means associated with said drum means and adapted to rotate said drum means, a first curved member mounted near the second end of said first member, a second curved member mounted near the second end of said second member, said cable means including a first cable looped around said first curved member, one end of said first cable being attached to said drum means and the other end being attached to substantially the first end of said second tubular member, a second cable, one end of said second cable being attached to said drum means and the other end being attached to said third tubular member, said drum means adapted to wind up said first cable and to unwind said second cable simultaneously, a third cable looped around said second curved member, one end of said third cable being attached to said first tubular member and the other end being attached to substantially the first end of said third tubular member, and spring bias means in one of said cables, said spring bias means being operative to take up any slack in said cables.

2. A telescopic material handling apparatus as set forth in claim 1 in which the drum means includes a first drum having a first circumference, a second drum having a second circumference one half that of said first circumference, said drums being driven so when one revolves once the other revolves once, said first cable being attached to said second drum and said second cable being attached to said first drum.

3. A telescopic material handling apparatus as set forth in claim 2 in which said curved members are sheaves and said spring bias means is mounted in said third cable.

4. A telescoping material handling apparatus comprising a plurality of vertically disposed and nested tubular members adapted for telescopic movement with respect to each other and interconnected by cable means, said tubular members including a first member, a second member telescoping in said first member, and a third member telescoping in said second member, said third member having a flange on its lower end, and a material handling means mounted on said flange, first guide means between said first and second members to maintain said first and second members in spaced relation to each other, second guide means between said second and third members to maintain said second and third members in spaced relation to each other, an axle mounted on said first tubular member, a double faced drum associated with said axle and adapted to rotate about said axle, the circumference of one face of said drum being twice as great as the circumference of the other face, motor means with reverse drive connected to said drum and adapted to rotate said drum in clockwise and counterclockwise directions, a first sheave mounted in substantially the lower end of said first tubular member, a second sheave mounted in substantially the lower end of said second tubular member, said cable means including a first cable reeved over said first sheave, one end of said first cable being attached to said drum face having the smaller circumference and the other end being attached to substantially the upper end of said second tubular member, a second cable, one end of said second cable being attached to said drum face having the larger circumference and the other end being attached to said flange, spring bias means attached to substantially the lower end of said first tubular member, and a third cable reeved over said second sheave, one end of said third cable being attached to said spring bias means and the other end being attached to substantially the upper end of said third tubular member.

References Cited in the file of this patent

UNITED STATES PATENTS

| 1,345,304 | Zied | June 29, 1920 |
| 2,545,047 | Russell | Mar. 13, 1951 |
| 2,787,343 | Mitchell | Apr. 2, 1957 |
| 2,819,803 | Obenchain | Jan. 14, 1958 |

FOREIGN PATENTS

| 786,337 | Great Britain | Nov. 13, 1957 |

UNITED STATES PATENT OFFICE
CERTIFICATE OF CORRECTION

Patent No. 3,109,545            November 5, 1963

Robert S. Hedin

It is hereby certified that error appears in the above numbered patent requiring correction and that the said Letters Patent should read as corrected below.

Column 3, line 23, for "fashioned" read -- fastened --.

Signed and sealed this 21st day of April 1964.

(SEAL)
Attest:
ERNEST W. SWIDER
Attesting Officer

EDWARD J. BRENNER
Commissioner of Patents